United States Patent
Tavcar (10) Patent No.: US 11,731,205 B2
(45) Date of Patent: Aug. 22, 2023

(54) RESISTANCE SOLDERING METHOD AND SOLDERING DEVICE

(71) Applicant: Matevz Tavcar, Komen (SI)

(72) Inventor: Matevz Tavcar, Komen (SI)

(73) Assignee: Mahle International GmbH

( * ) Notice: Subject to any disclaimer, the term of this patent is extended or adjusted under 35 U.S.C. 154(b) by 602 days.

(21) Appl. No.: 16/851,068

(22) Filed: Apr. 16, 2020

(65) Prior Publication Data

US 2020/0331084 A1 Oct. 22, 2020

(30) Foreign Application Priority Data

Apr. 17, 2019 (EP) ..................................... 19169813

(51) Int. Cl.
 *B23K 1/00* (2006.01)
 *B23K 3/00* (2006.01)
 *B23K 3/08* (2006.01)

(52) U.S. Cl.
 CPC .............. *B23K 1/0004* (2013.01); *B23K 3/08* (2013.01)

(58) Field of Classification Search
 CPC ........ B23K 1/0004; B23K 1/008; B23K 1/20; B23K 11/002; G01R 31/71; G01R 31/2884; G01R 1/0408; G01R 1/06
 See application file for complete search history.

(56) References Cited

U.S. PATENT DOCUMENTS

| | | | |
|---|---|---|---|
| 3,621,193 A | 11/1971 | Deputy | |
| 6,452,502 B1* | 9/2002 | Dishongh | G01R 31/2856 340/661 |
| 11,132,485 B2* | 9/2021 | Landman | G06F 30/3315 |
| 11,269,020 B2* | 3/2022 | Wu | G01R 31/71 |
| 11,454,669 B2* | 9/2022 | Kumar | H05K 1/0254 |
| 2002/0044331 A1* | 4/2002 | Agrawal | H01M 14/005 359/254 |
| 2006/0194353 A1* | 8/2006 | Spuhler | G01R 31/71 438/14 |
| 2006/0208033 A1* | 9/2006 | Welter | B23K 28/02 228/110.1 |

(Continued)

FOREIGN PATENT DOCUMENTS

| | | |
|---|---|---|
| CN | 104 959 722 A | 10/2015 |
| JP | H11 5158 A | 1/1999 |

OTHER PUBLICATIONS

English abstract for CN-104959722.
English abstract for JP-H11 5158.

*Primary Examiner* — Erin B Saad
(74) *Attorney, Agent, or Firm* — Fishman Stewart PLLC (57) ABSTRACT

The present disclosure describes a resistance soldering method for producing a plate assembly including at least two basic elements that are materially bonded together via a soldering device, e.g., for producing a winding of an electrical machine. The method includes applying an output voltage to a first electrode and a second electrode, between which the at least two basic elements are arranged, to solder a solder element interposed therebetween; detecting a correct or incorrect position of the solder element in the plate assembly via a control unit; determining via the control unit a voltage between the solder element and one or more points on the electric circuit. The control unit detects the correct or incorrect position of the solder element through an evaluation and/or a comparison with reference to the voltage or voltages.

18 Claims, 4 Drawing Sheets

(56) References Cited

U.S. PATENT DOCUMENTS

| | | | | |
|---|---|---|---|---|
| 2006/0249562 A1* | 11/2006 | Voice | ............... | B23K 1/008 |
| | | | | 228/262.9 |
| 2008/0144243 A1* | 6/2008 | Mariani | ............... | G01R 31/71 |
| | | | | 324/763.01 |
| 2009/0058435 A1* | 3/2009 | Nakamura | ............... | G01R 27/14 |
| | | | | 324/719 |
| 2020/0331084 A1* | 10/2020 | Tavcar | ............... | B23K 1/0004 |
| 2021/0161011 A1* | 5/2021 | Zou | ............... | H01L 23/49816 |

\* cited by examiner

RESISTANCE SOLDERING METHOD AND SOLDERING DEVICE

CROSS-REFERENCE TO RELATED APPLICATION

This application claims priority to European Application No. 19169813.3 filed on Apr. 17, 2019, the contents of which are hereby incorporated by reference in its entirety.

TECHNICAL FIELD

The invention relates to a resistance soldering method for the production of a plate assembly comprised of at least two basic elements which are materially bonded by means of the resistance soldering method, and to a soldering device for this purpose.

BACKGROUND

Resistance soldering methods and soldering devices for this purpose are already known from the prior art. The resistance soldering method is appropriate, for example, for the production of a winding of an electrical machine. For the production of the respective winding, a solder element is arranged between the two copper plates, and the copper plates, together with the solder element, are compressed between the electrodes of the soldering device. A voltage is applied to the electrodes of the soldering device, which then flows through the two copper plates and the solder element. As a result of the heat generated by the application of the voltage to the solder element, the latter melts and connects the two copper plates in a materially bonded manner. The correct positioning of the solder element between the two copper plates is critical to the production of the respective winding. If this is not achieved, and the solder element is not arranged between the copper plates, it is possible that the two copper plates will not be soldered, or only incorrectly soldered together.

Resistance soldering methods are customarily executed automatically and, correspondingly, the solder element is positioned automatically between the respective copper plates. The solder element can thus also assume an incorrect position such that, in the winding thus produced, a number of soldering points may be defective. Any such windings must be discarded thereafter, by the execution of controls. In order to avoid the additional costs and additional complexity associated with subsequent controls, it is customary in resistance soldering for the presence of the solder element to be directly and optically detected by means of a CCD camera (CCD: charge coupled device). However, this is associated with a high complexity of evaluation and high costs.

SUMMARY

The object of the invention is therefore the improvement of a resistance soldering method of the generic type, and the provision of an improved soldering device for this purpose, thus permitting the above-mentioned disadvantages to be overcome.

According to the invention, this object is fulfilled by the subject matter of the independent claim(s). Advantageous forms of embodiment are the subject matter of the dependent claims.

A resistance soldering method is provided for the production of a plate assembly comprised of at least two basic elements which are materially bonded by the resistance soldering method, using a soldering device. Specifically, the resistance soldering method is appropriate for the production of a winding of an electrical machine. In the resistance soldering method, a first basic element and a second basic element are spaced and, with respect to a mounting direction, are arranged one above the other between a first electrode and a second electrode of the soldering device. Between the first basic element and the second basic element, a solder element is arranged in contact with said elements. An output voltage is applied to the electrodes, as a result of which an electric circuit is constituted, and the two basic elements are soldered together by means of the solder element. In the resistance soldering method, the correct or incorrect position of the solder element in the plate assembly is detected by a control unit. According to the invention, the control unit, upon the detection of the correct or incorrect position of the solder element in the plate assembly, determines at least one voltage which is constituted between the solder element and one point on the electric circuit. Thereafter, with reference to the at least one voltage thus determined, the control unit detects the correct or incorrect position of the solder element in the plate assembly, by means of an evaluation and/or a comparison.

In the resistance soldering method, the two electrically-conductive basic elements are soldered together by means of the solder element. The two electrodes of the soldering device, the two basic elements and the solder element each have a determinable electrical resistance such that, in the resistance soldering method, upon the application of the output voltage to the plate assembly, a series circuit and consequently a voltage divider are constituted. The correct position of the solder element in the plate assembly is thus the position of the solder element between the two basic elements. With the solder element in the correct position, a soldering point can be constituted between the two basic elements, and the two basic elements can be joined together in a materially bonded manner. Any position of the solder element which deviates herefrom is thus the incorrect position. Depending upon the position of the solder element in the circuit, the voltage determined by the control unit between the solder element and the same point in the circuit can also differ, as the voltage is measured on differing elements of the circuit. By means of an evaluation and/or a comparison, the control unit can then detect the correct or incorrect position of the solder strip. Advantageously, the control unit, in the method according to the invention, can determine the voltage between the solder element and one point in the electric circuit or, alternatively, can also determine a plurality of voltages between the solder element and the plurality of mutually divergent points in the electric circuit.

Advantageously, it can be provided that the control unit compares the at least one determined voltage with a saved comparative value, and thus detects the correct or incorrect position of the solder element in the plate assembly. The saved comparative value can correspond, for example, to the voltage between the solder element and the predefined point in the electric circuit, in the event of the correct positioning of the solder strip. If the at least one voltage thus determined does not correspond to the comparative value, the control unit can thus establish the incorrect position of the solder strip in the plate assembly. If the at least one voltage thus determined corresponds to the comparative value, the control unit can thus establish the correct position of the solder strip in the plate assembly. It will naturally be understood that the comparison executed by the control unit can also be executed with a specified tolerance. If, in the resistance soldering method, voltages are determined between the solder element and mutually divergent points in the circuit, these can be compared with the respective saved comparative values.

It can additionally be provided that, in the detection of the correct or incorrect position of the solder element in the plate assembly, the control unit determines a first voltage which is constituted between the first electrode or the first basic element and the solder element and/or a second voltage which is constituted between the second electrode or the second basic element and the solder element. In the event of the correct positioning of the solder element in the plate assembly, the first voltage can be dependent upon a first electrical resistance, which can be composed of the electrical resistance of the first electrode and/or of the electrical resistance of the first basic element and/or of the contact resistance between the first electrode and the first basic element and/or of the electrical resistance of the solder element. In the event of the correct positioning of the solder element in the plate assembly, the second voltage can be dependent upon a second electrical resistance, which can be composed of the electrical resistance of the second electrode and/or of the electrical resistance of the second basic element and/or of the contact resistance between the second electrode and the second basic element and/or of the electrical resistance of the solder element. The voltages determined by the control unit can then be compared with the saved comparative values, and the correct or incorrect position of the solder element can be detected accordingly.

In an alternative embodiment of the resistance soldering method, it is provided that, in the detection of the correct or incorrect position of the solder element in the plate assembly, the control unit determines the output voltage, a first voltage which is constituted between the first electrode or the first basic element and the solder element, and a second voltage which is constituted between the second electrode or the second basic element and the solder element. Thereafter, in accordance with the output voltage, the first voltage and the second voltage, the control unit detects the correct or incorrect position of the solder element in the plate assembly. In the detection of the correct or incorrect position of the solder element in the plate assembly, the first voltage and the second voltage are determined, which vary according to the position of the solder element in the plate assembly. The control unit can thus detect the correct or incorrect position of the solder element in the plate assembly in a simplified and secure manner.

Advantageously, the resistance soldering method can be executed such that, in the event of the correct positioning of the solder element in the plate assembly, the first voltage is dependent upon a totalized first resistance. The first totalized resistance is composed of the electrical resistance of the first electrode and/or of the electrical resistance of the first basic element and/or of the contact resistance between the first electrode and the first basic element and/or of the electrical resistance of the solder element. Moreover, in the event of the correct positioning of the solder element in the plate assembly, the second voltage is dependent upon a totalized second resistance. The second totalized resistance is comprised of the electrical resistance of the second electrode and/or of the electrical resistance of the second basic element and/or of the contact resistance between the second electrode and the second basic element and/or of the electrical resistance of the solder element. It is understood that the totalized first resistance and the totalized second resistance can also include further electrical resistances—such as, for example, the resistances of electrical conductors.

If the two basic elements and the two electrodes are identical, and the first voltage is measured between the first electrode and the solder strip and the second voltage is measured between the solder element and the second solder strip, the first totalized resistance is equal to the second totalized resistance, and the first voltage is correspondingly equal to the second voltage. The first totalized resistance is composed of the electrical resistance of the first electrode, of the electrical resistance of the first basic element, and of the contact resistance between the first electrode and the first basic element. The second totalized resistance is composed of the electrical resistance of the second electrode, of the electrical resistance of the second basic element, and of the contact resistance between the second electrode and the second basic element.

Conversely, if the solder element is arranged incorrectly between the first electrode and the first basic element, the first voltage continues to be determined by the totalized first resistance, and the second voltage by the totalized second resistance. However, the totalized first resistance differs from that associated with the correct position of the solder element, in that it is composed of the electrical resistance of the first electrode. The totalized second resistance differs from that associated with the correct position of the solder element, in that it is composed of the electrical resistances of the two basic elements, the solder element and the second electrode, and of the electrical contact resistances between the second electrode and the second basic element, and between the two basic elements. As a result of the differing totalized resistances, the two voltages also differ from one another. The same applies if the solder element is incorrectly arranged between the second electrode and the second basic element.

If, incorrectly, the solder element is not at all arranged between the two basic elements, the totalized first resistance and the totalized second resistance are close to zero, and both the first voltage and the second voltage correspond to the output voltage. It is understood that the two totalized resistances, depending upon the position of the solder element, can also include the electrical resistance of electrical conductors.

Advantageously, it can be provided that the control unit calculates a first ratio between the first voltage and the output voltage, and a second ratio between the second voltage and the output voltage. The control unit, by an evaluation and/or a comparison of the first ratio and the second ratio, then detects the correct or incorrect position of the solder element in the plate assembly. In this advantageous manner, the values of the first voltage, the second voltage and the compensating voltage can be relativized, and the control unit can detect the correct or incorrect position of the solder element in the plate assembly, independently of the absolute values of the first voltage, the second voltage and the compensating voltage.

In an advantageous further development of the resistance soldering method, it is provided that the control unit, by means of an output voltage measuring device, continuously measures an output voltage signal during the resistance soldering process and, from the output voltage signal, executes a read-off of the output voltage which correlates to a specified time point. Additionally, the control unit can integrate the output voltage signal, prior to the read-off of the output voltage, by means of an integrator. If, in the detection of the correct or incorrect position of the solder element, the first voltage and the second voltage are consulted, the control unit, by means of a first voltage measuring device, can record a first voltage signal and, by means of a second voltage measuring device, can record a second voltage signal throughout the resistance soldering process, with no interruption. The control unit, from the first voltage signal, then executes a read-off of the first voltage which correlates to a specified time point and, from the second voltage signal, executes a read-off of the second voltage which correlates to a specified time point. Additionally, the control unit can respectively integrate the first voltage signal prior to the read-off of the first voltage and the second voltage signal prior to the read-off of the second voltage, by means of an integrator. It can also be provided that the control unit executes the read-off of the output voltage, the first voltage and the second voltage at the same specified time point.

In the resistance soldering method, it can be provided that the first basic element is employed in the form of a first electrical conductor and/or the second basic element is employed in the form of a second electrical conductor. Alternatively or additionally, the first basic element and/or the second basic element can respectively be employed in the form of a plurality of electrical conductors which are soldered together by the resistance soldering method. Thus, in the resistance soldering method, for example, two electrical conductors can firstly be soldered to one another to constitute a basic element. This basic element and a further electrical conductor, or a further basic element comprised of a plurality of electrical conductors which are soldered to one another by the resistance soldering method, can then be soldered together to constitute a further basic element. In this manner, in principle, the plate assembly can be produced from a plurality of electrical conductors which are soldered to one another.

In summary, in the resistance soldering method according to the invention, the correct or incorrect position of the solder element in the plate assembly can be detected in a simplified and secure manner by means of the control unit. As a result, defective soldering points in the plate assembly can be prevented, and the number of rejected components reduced accordingly.

The invention further relates to a soldering device for the resistance soldering of two basic elements to constitute a plate assembly. The soldering device is specifically appropriate for the resistance soldering of a winding of an electrical machine. The soldering device comprises a first electrode and a second electrode, between which the two basic elements can be compressed in the mounting direction, with the interposition of a solder element, and can be resistance soldered by the application of an output voltage. The soldering device further comprises a control unit for detecting the correct or incorrect position of the solder element in the plate assembly. According to the invention, the soldering device is configured for the execution of the resistance soldering method described above.

In a further development of the soldering device, it is provided that the soldering device comprises a controlling system for the operation of the soldering device. The controlling system is configured for the operation of the soldering device according to the resistance soldering method described above. The controlling system can thus comprise actuators for the actuation of the two electrodes and/or a voltage supply unit for the supply of the output voltage to the soldering device and/or the control unit for detecting the correct or incorrect position of the solder element in the plate assembly.

Advantageously, it can be provided that the control unit comprises an output voltage measuring device for detecting an output voltage signal, a first voltage measuring device for detecting a first voltage signal between the first electrode or the first basic element and the solder element, and a second voltage measuring device for detecting a second voltage signal between the second electrode or the second basic element and the solder element. The control unit can moreover comprise at least one integrator for integrating the output voltage signal and/or the first voltage signal and/or the second voltage signal. The output voltage determined by the control unit can be correlated to the output voltage signal at a specified time point. The first voltage determined by the control unit can be correlated to the first voltage signal at a specified time point, and the second voltage determined by the control unit can be correlated to the second voltage signal at a specified time point. Advantageously, the specified time point for the read-off of the output voltage, the first voltage and the second voltage can be one and the same.

Further significant characteristics and advantages of the invention proceed from the sub-claims, from the drawings and from the associated description of the figures, with reference to the drawings.

It is understood that the above-mentioned characteristics, and those described hereinafter, can not only be employed in the respective combination indicated, but also in other combinations, or in isolation, without departing from the scope of the present invention.

Preferred exemplary embodiments of the invention are represented in the drawings, and are described in greater detail in the following description, wherein the same reference numbers are applied to identical, similar or functionally equivalent components.

DETAILED DESCRIPTION

Figure 1:
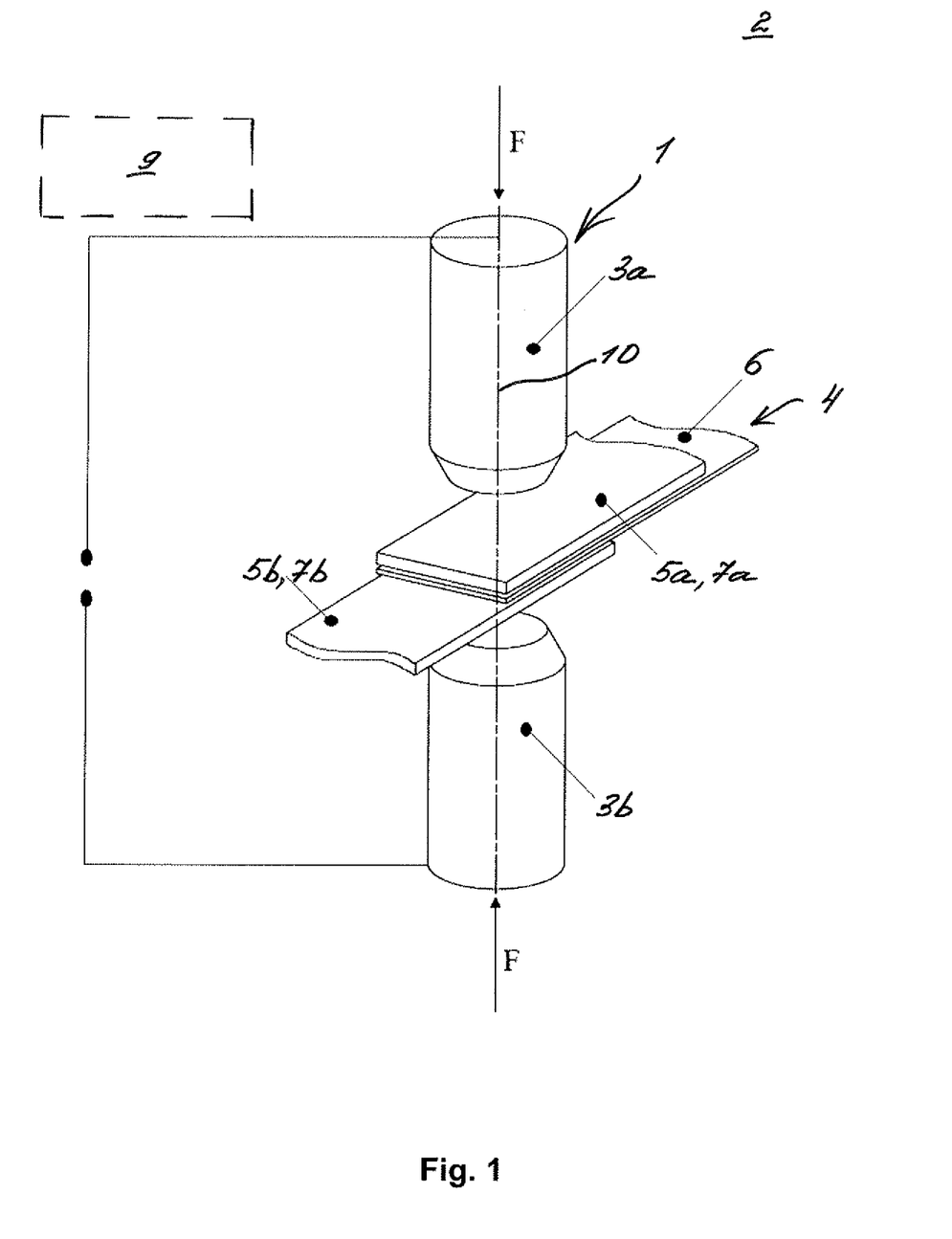
FIGS. 1 and 2 show views of a soldering device according to the invention for executing a resistance soldering method according to the invention.
Figure 2:
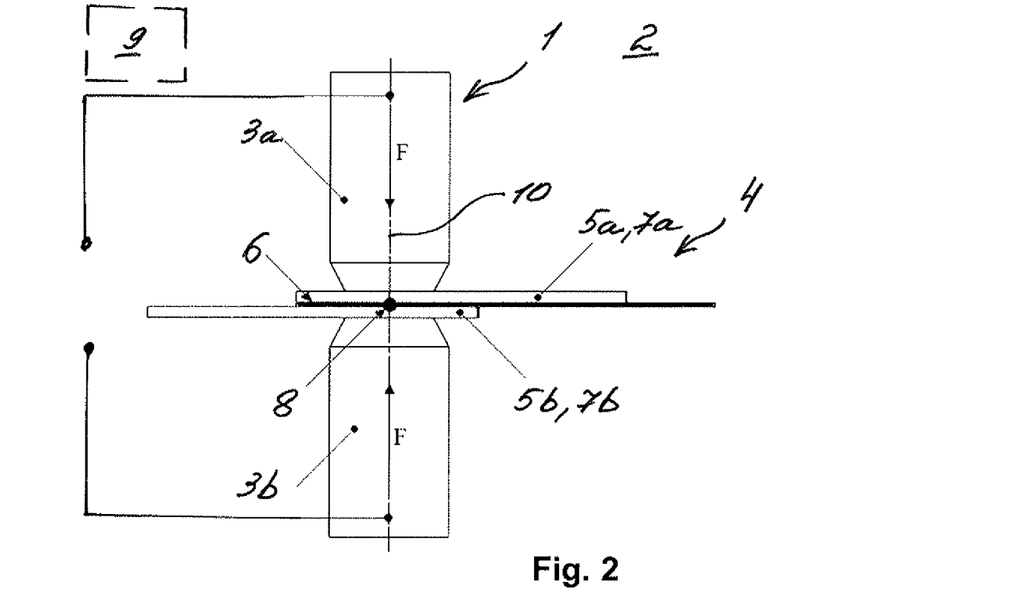

FIG. 1 and FIG. 2 show views of a soldering device 1 according to the invention for executing a resistance soldering method 2 according to the invention. The soldering device 1 comprises a first electrode 3a and a second electrode 3b, between which a plate assembly 4 is arranged for resistance soldering. The plate assembly 4 comprises a first basic element 5a and a second basic element 5b, between which a solder element 6 is arranged. In this case, the first basic element 5a and the second basic element 5b are respectively constituted by an electrical conductor 7a and an electrical conductor 7b. The soldering device 1 comprises a control unit 9, which can detect the correct or incorrect position of the solder element 6 in the plate assembly 4. The control unit 9 is only schematically represented here. The correct position of the solder element 6 in the plate assembly 4 is thus the position of the solder element 6 between the two basic elements 5a and 5b, as represented here. With the solder element 6 in the correct position, a soldering point 8—c.f. FIG. 2—can be constituted between the two basic elements 5a and 5b. At the soldering point 8, the two basic elements 5a and 5b are materially bonded to one another. Any position of the solder element 6 in the plate assembly 4 which deviates herefrom is thus the incorrect position.

Figure 3:
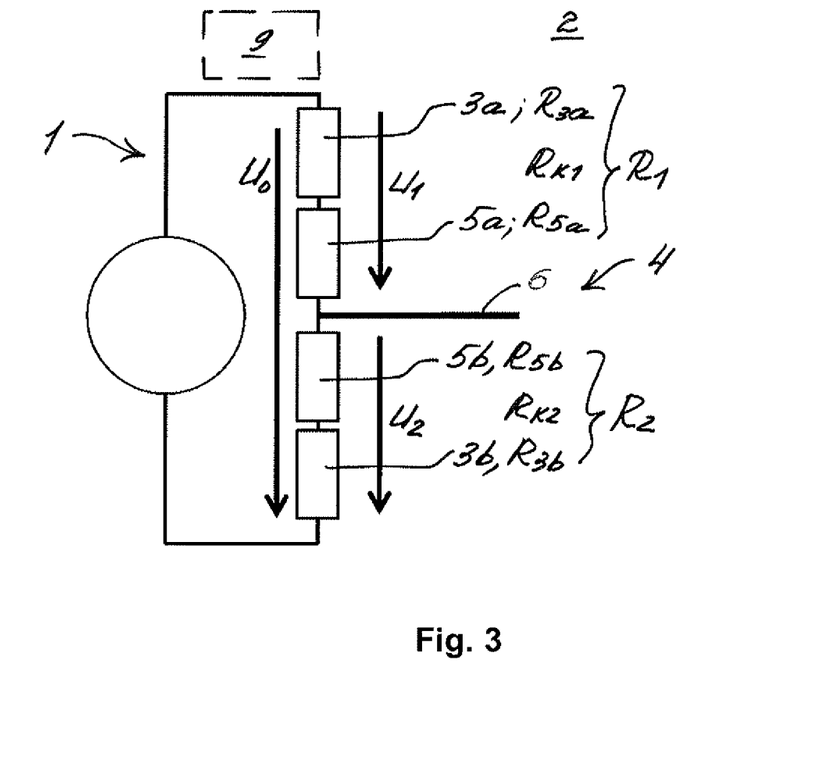
FIG. 3 shows a schematic plan of the resistance soldering method according to the invention.

In the resistance soldering method 2, according to FIG. 1, the first basic element 5a and the second basic element 5b are spaced and, with respect to a mounting direction 10, are arranged one above the other between the first electrode 3a and the second electrode 3b of the soldering device 1. The solder element 6 is arranged between the first basic element 5a and the second basic element 5b. By means of the electrodes 3a and 3b, the solder element 6 is then compressed together with the basic elements 5a and 5b by a force F, as represented in FIG. 2. Thereafter, an output voltage $U_0$—c.f. FIG. 3—is applied to the electrodes 3a and 3b and, as a result, the two basic elements 5a and 5b are soldered to one another at the soldering point 8 by means of the solder element 6. It is understood that the soldering point 8 defined herein is not a point-type bond and, depending upon the quantity of heat generated by the resistance soldering method 2, can also extend over the entire contact region of the two basic elements 5a and 5b.

In the resistance soldering method 2, the correct or incorrect position of the solder element 6 in the plate assembly 4 is detected by the control unit 9. FIG. 3 illustrates a schematic plan for this purpose. The electrodes 3a and 3b of the soldering device 1, the basic elements 5a and 5b and the solder element 6 of the plate assembly 4 each have a determinable electrical resistance such that, in the resistance soldering method 2, upon the application of the output voltage $U_0$, a series circuit, and thus a voltage divider, are constituted by the electrodes 3a and 3b and the plate assembly 4. In the event of the correct positioning of the solder element 6 in the plate assembly 4—as represented here—a first voltage $U_1$ between the first electrode 3a and the solder element 6 is dependent upon a totalized first resistance $R_1$. The totalized first resistance $R_1$ is composed of the electrical resistance $R_{3a}$ of the first electrode 3a, of the electrical resistance $R_{5a}$ of the first basic element 5a, and of the contact resistance $R_{K1}$ between the first electrode 3a and the first basic element 5a. A second voltage $U_2$ between the second electrode 3b and the solder element 6 is dependent upon a totalized second resistance $R_2$. The second totalized resistance $R_2$ is composed of the electrical resistance $R_{3b}$ of the second electrode 3b, of the electrical resistance $R_{5b}$ of the second basic element 5b, and of the contact resistance $R_{K2}$ between the second electrode 3b and the second basic element 5b.

The control unit 9, upon the detection of the correct or incorrect position of the solder element 6 in the plate assembly 4, determines the output voltage $U_0$, the first voltage $U_1$ and the second voltage $U_2$. The control unit 9 then calculates a first ratio between the first voltage $U_1$ and the output voltage $U_0$, and a second ratio between the second voltage $U_2$ and the output voltage $U_0$. By an evaluation and/or comparison of the first ratio and the second ratio, the control unit 9 can detect the correct or incorrect position of the solder element 6 in the plate assembly 4 in a simplified and secure manner.

The detection of the correct or incorrect position of the solder element 6 is described in greater detail hereinafter with reference to FIG. 4 to FIG. 7. In the interests of simplification, it is assumed that the two electrodes 3a and 3b and the two basic elements 5a and 5b are identical, and the electrical resistances $R_{3a}$ and $R_{3b}$, the electrical resistances $R_{5a}$ and $R_{5b}$, and the contact resistances $R_{K1}$ and $R_{K2}$ are respectively equal.

Figure 4:
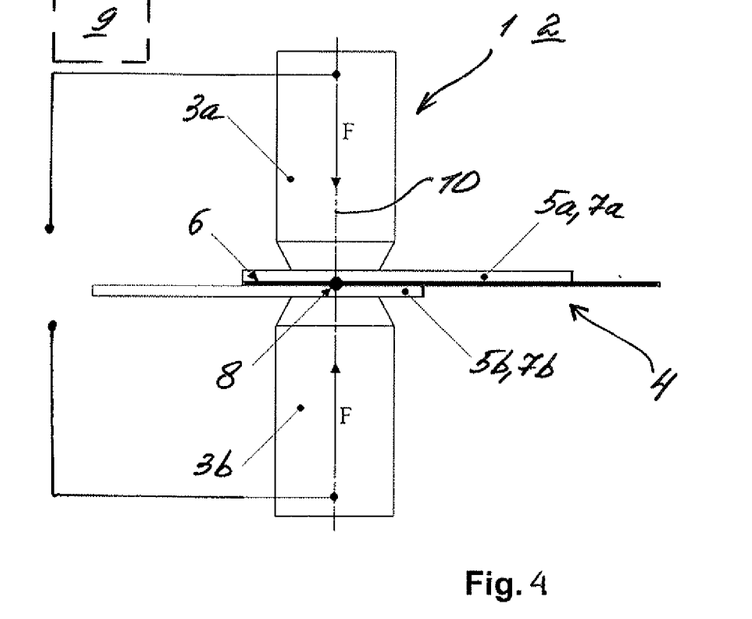
FIG. 4 shows a view of the soldering device according to the invention, with a plate assembly in which the solder element is in the correct position.

FIG. 4 shows a view of the soldering device 1 and the plate assembly 4, in which the solder element 6 is arranged between the two basic elements 5a and 5b, and is thus in the correct position. An impeccable soldering point 8 is constituted in this case. Here, the electrical resistance $R_1$ is equal to the electrical resistance $R_2$, such that the voltages $U_1$ and $U_2$ are equal, and the first ratio $U_1$ to $U_0$ and the second ratio $U_2$ to $U_0$ are respectively ½.

Figure 5:
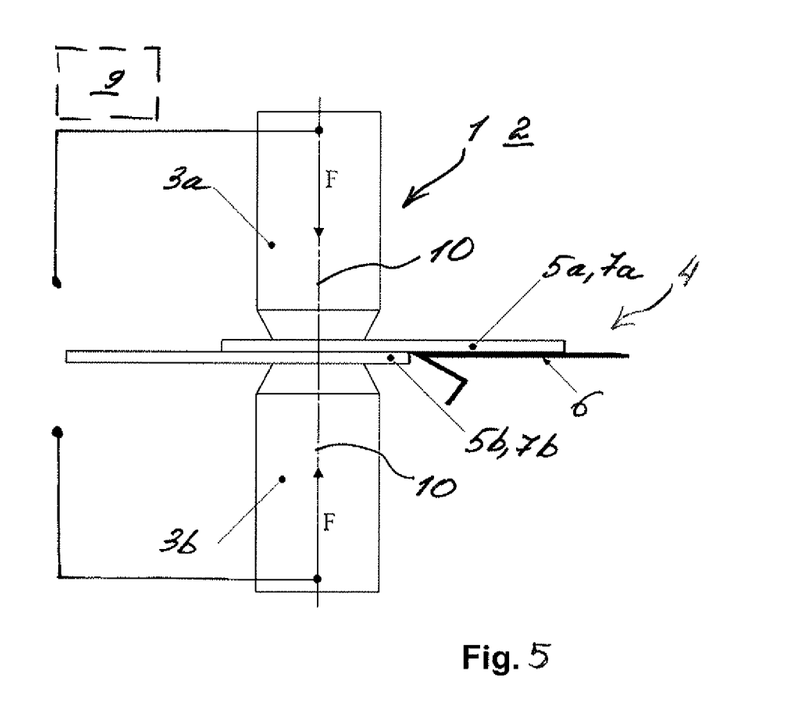
FIGS. 5 to 7 show views of the soldering device according to the invention, with the plate assembly in which the solder element is in the incorrect position.

FIG. 5 shows a view of the soldering device 1 and the plate assembly 4, in which the solder element 6 is not at all arranged between the basic elements 5a and 5b, and is thus in the incorrect position. A soldering point 8 is not constituted between the basic elements 5a and 5b. In this case, the electrical resistance $R_1$ is equal to the electrical resistance $R_2$, and the voltages $U_1$ and $U_2$ are close to equal to the output voltage $U_0$. The first ratio $U_1$ to $U_0$ and the second ratio $U_2$ to $U_0$ are respectively close to 1.

Figure 6:
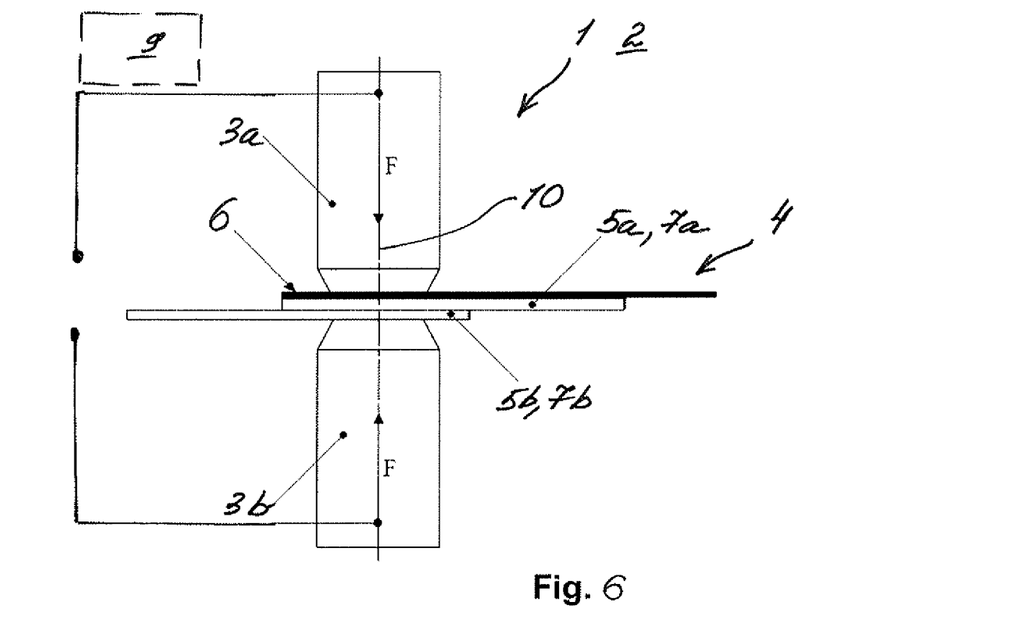

FIG. 6 shows a view of the soldering device 1 and the plate assembly 4, in which the solder element 6 is arranged between the first electrode 3a and the first basic element 5a, and is thus in the incorrect position. In this case, no soldering point 8 is constituted between the basic elements 5a and 5b. The first resistance $R_1$ is composed of the resistance $R_{3a}$ of the first electrode 3a. Conversely, the second resistance $R_2$ is composed of the resistances $R_{5a}$, $R_{5b}$, $R_{3b}$, $R_{K2}$, and of a contact resistance between the two basic elements 5a and 5b. The first voltage $U_1$ is correspondingly smaller than the second voltage $U_2$. The first ratio $U_1$ to $U_0$ and the second ratio $U_2$ to $U_0$ differ from each other, and assume unequal values of ½ or 1.

Figure 7:
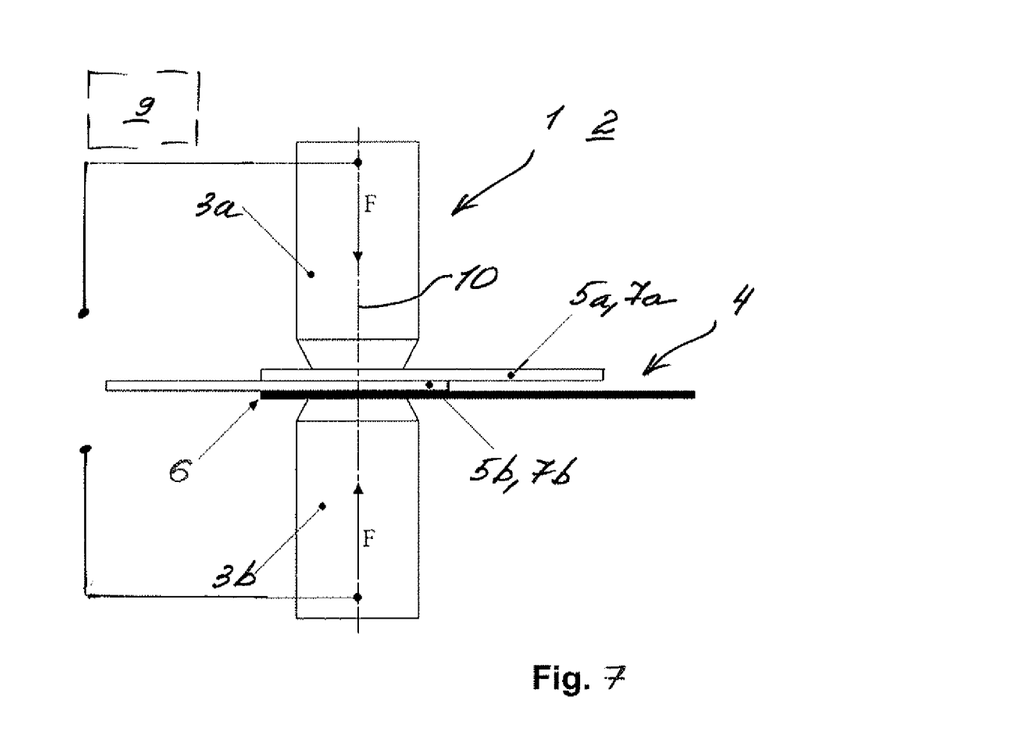

FIG. 7 shows a view of the soldering device 1 and the plate assembly 4, in which the solder element 6 is arranged between the second electrode 3b and the second basic element 5b, and is thus in the incorrect position. Here again, no soldering point 8 is constituted between the basic elements 5a and 5b. The same comments apply here as to FIG. 6 wherein, however, the resistance $R_2$ is smaller than the resistance $R_1$.

In summary, in the resistance soldering method 2 according to the invention, the correct or incorrect position of the solder element 6 can be detected by the control unit 9 in a simplified and secure manner. As a result, defective soldering points in the plate assembly 4 can be prevented, and the number of rejected components reduced accordingly.

The invention claimed is:

1. A resistance soldering method for producing a plate assembly comprised of at least two elements that are materially bonded via a soldering device, comprising:

providing a first element and a second element spaced apart and, with respect to a mounting direction, arranged one above the other between a first electrode and a second electrode of the soldering device;

arranging a solder element between and in contact with the first element and the second element;

applying an output voltage to the first electrode and the second electrode to provide an electric circuit and solder the first element and the second element together via the solder element;

detecting a correct or incorrect position of the solder element in the plate assembly via a control unit;

determining via the control unit, upon the detection of the correct or incorrect position of the solder element in the plate assembly, a voltage between the solder element and one point on the electric circuit, or voltages between the solder element and mutually divergent points on the electric circuit, and wherein the control unit detects the correct or incorrect position of the solder element via at least one of an evaluation and a comparison with reference to the voltage or voltages determined.

2. The resistance soldering method as claimed in claim 1, wherein the at least one of the evaluation and the comparison includes the control unit comparing the determined voltage with a saved comparative value or the determined voltages with saved comparative values to detect the correct or incorrect position of the solder element in the plate assembly.

3. The resistance soldering method as claimed in claim 2, wherein in the detection of the correct or incorrect position of the solder element in the plate assembly, the control unit determines at least one of (i) a first voltage that is constituted between the first electrode or the first element and the solder element, and (ii) a second voltage that is constituted between the second electrode or the second element and the solder element.

4. The resistance soldering method as claimed in claim 3, wherein at least one of:

in the event of the correct positioning of the solder element in the plate assembly, the first voltage is dependent upon a first electrical resistance, that is composed of at least one of the electrical resistance of the first electrode, the electrical resistance of the first element, the contact resistance between the first electrode and the first element, and of the electrical resistance of the solder element, and in the event of the correct positioning of the solder element in the plate assembly, the second voltage is dependent upon a second electrical resistance, that is composed of at least one of the electrical resistance of the second electrode, the electrical resistance of the second element, the contact resistance between the second electrode and the second element, and the electrical resistance of the solder element.

5. The resistance soldering method as claimed in claim 1, wherein:

upon the detection of the correct or incorrect position of the solder element in the plate assembly, the control unit determines the output voltage, a first voltage constituted between the first electrode or the first element and the solder element, and a second voltage constituted between the second electrode or the second element and the solder element; and the control unit, in accordance with the output voltage, the first voltage and the second voltage, detects the correct or incorrect position of the solder element in the plate assembly.

6. The resistance soldering method as claimed in claim 5, wherein:

the control unit calculates a first ratio between the first voltage and the output voltage, and a second ratio between the second voltage and the output voltage; and the control unit, by at least one of the evaluation and a comparison of the first ratio and the second ratio, detects the correct or incorrect position of the solder element in the plate assembly.

7. The resistance soldering method as claimed in claim 5, wherein:

in the event of the correct positioning of the solder element in the plate assembly, the first voltage is dependent upon a first electrical resistance that is composed of at least one of the electrical resistance of the first electrode, the electrical resistance of the first element, the contact resistance between the first electrode and the first element, and the electrical resistance of the solder element, and in the event of the correct positioning of the solder element in the plate assembly, the second voltage is dependent upon a second electrical resistance that is composed of at least one of the electrical resistance of the second electrode, the electrical resistance of the second element, the contact resistance between the second electrode and the second element, the electrical resistance of the solder element.

8. The resistance soldering method as claimed in claim 1, wherein:

the control unit, via an output voltage measuring device, continuously measures an output voltage signal during the resistance soldering process; and the control unit, from the output voltage signal, executes a read-off of the output voltage that correlates to a specified time point.

9. The resistance soldering method as claimed in claim 8, wherein the control unit integrates the output voltage signal prior to the read-off of the output voltage via an integrator.

10. The resistance soldering method as claimed in claim 3, wherein:

the control unit, via a first voltage measuring device, records a first voltage signal throughout the resistance soldering process with no interruption; and the control unit, from the first voltage signal, executes a read-off of the first voltage that correlates to a specified time point.

11. The resistance soldering method as claimed in claim 10, wherein the control unit, via an integrator, integrates the first voltage signal prior to the read-off of the first voltage.

12. The resistance soldering method as claimed in claim 3, wherein:

the control unit, via a second voltage measuring device, records a second voltage signal throughout the resistance soldering process with no interruption; and the control unit, from the second voltage signal, executes a read-off of the second voltage that correlates to a specified time point.

13. The resistance soldering method as claimed in claim 12, wherein the control unit, via an integrator, integrates the second voltage signal prior to the read-off of the second voltage.

14. The resistance soldering method as claimed in claim 3, wherein the control unit determines the output voltage, the first voltage and the second voltage at the same specified time point.

15. The resistance soldering method as claimed in claim 1, wherein at least one of:

at least one of the first element is a first electrical conductor and the second element is a second electrical conductor, and at least one of the first element and the second element are a plurality of electrical conductors that are soldered together by the resistance soldering method.

16. The resistance soldering method as claimed in claim 1, wherein the first electrode and the second electrode compress the solder element together with the first element and the second element by a force before applying the output voltage.

17. A resistance soldering method for producing a plate assembly, comprising:

providing a first electrical conductor and a second electrical conductor of the plate assembly spaced apart and, with respect to a mounting direction, arranged one above the other between a first electrode and a second electrode of a soldering device;

arranging a solder element of the plate assembly between and in contact with the first electrical conductor and the second electrical conductor;

applying an output voltage to the first electrode and the second electrode to provide an electric circuit and solder the first electrical conductor and the second electrical conductor together via the solder element;

detecting a correct or incorrect position of the solder element in the plate assembly via a control unit;

determining via the control unit, upon the detection of the correct or incorrect position of the solder element in the plate assembly, a voltage between the solder element and one point on the electric circuit, or voltages between the solder element and mutually divergent points on the electric circuit, and wherein the control unit detects the correct or incorrect position of the solder element via at least one of an evaluation and a comparison with reference to the voltage or voltages determined.

18. The resistance soldering method as claimed in claim 17, wherein the at least one of the evaluation and the comparison includes the control unit comparing the determined voltage with a saved comparative value or the determined voltages with saved comparative values to detect the correct or incorrect position of the solder element in the plate assembly.

* * * * *